United States Patent
Crouse et al.

(10) Patent No.: US 8,151,515 B2
(45) Date of Patent: Apr. 10, 2012

(54) DEVICE FOR THE REMOVAL OF ARACHNIDS, AND METHOD FOR REMOVAL OF SMALL ARACHNIDS AND INSECTS

(76) Inventors: Charles Eric Crouse, Enville, TN (US); Randall E. Staggs, Lawrenceburg, TN (US)

( * ) Notice: Subject to any disclaimer, the term of this patent is extended or adjusted under 35 U.S.C. 154(b) by 0 days.

(21) Appl. No.: 12/688,748

(22) Filed: Jan. 15, 2010

(65) Prior Publication Data

US 2011/0016771 A1    Jan. 27, 2011

Related U.S. Application Data

(60) Provisional application No. 61/271,778, filed on Jul. 27, 2009.

(51) Int. Cl.
*A01M 1/14* (2006.01)
*A01M 3/04* (2006.01)
*A01M 5/06* (2006.01)

(52) U.S. Cl. .............. 43/136; 43/132.1; 43/133; 43/134

(58) Field of Classification Search .................... 43/114, 43/124, 132.1, 133, 134, 136
See application file for complete search history.

(56) References Cited

U.S. PATENT DOCUMENTS

| | | | | |
|---|---|---|---|---|
| 3,708,908 A | * | 1/1973 | Levey | 43/114 |
| 3,816,956 A | | 6/1974 | Sekula | |
| 4,052,811 A | * | 10/1977 | Shuster et al. | 43/136 |
| 4,411,093 A | * | 10/1983 | Stout et al. | 43/114 |
| 4,425,733 A | * | 1/1984 | Ammon et al. | 43/115 |
| 4,577,434 A | * | 3/1986 | Davis | 43/115 |
| 5,095,648 A | * | 3/1992 | Keenan | 43/136 |

(Continued)

FOREIGN PATENT DOCUMENTS
GB    2144020    *  2/1985

OTHER PUBLICATIONS

Scotch Mini Lint Roller. This mini lint roller contains 30 adhesive sheets non-removably supported over a cylindrical body. The body is connected to an elongated handle. The roller allows the sheets to spin around the body for lint removal. Each sheet is perforated for removal from the rest of the sheets. The roller is 3 inches wide. The Scotch Mini Lint Roller was purchased in Jan. 2010.

(Continued)

*Primary Examiner* — David Parsley
(74) *Attorney, Agent, or Firm* — Peter L. Brewer; Baker, Donelson, Bearman, Caldwell & Berkowitz, PC

(57) ABSTRACT

A device for the removal of small arachnids and insects from clothing and skin is provided. The device comprises a body having a first end and a second end. The device also includes an elongated stem, also having a first end and a second end. The first end of the stem is connected to the second end of the body. The device also comprises a tubular tape cartridge having: a supporting base member that is received on and freely rotates around the elongated stem, and a tape roll wound around the base member. The tape roll comprises a series of tape sections. The tape cartridge is dimensioned to be removably received over the elongated stem. The device also comprises a cap that removably covers the stem and tape cartridge. A method for removing small arachnids and insects from clothing and skin is also provided.

7 Claims, 4 Drawing Sheets

U.S. PATENT DOCUMENTS

| | | | |
|---|---|---|---|
| 5,155,950 | A | 10/1992 | Burgeson |
| 5,253,448 | A | 10/1993 | Byom |
| 5,425,197 | A * | 6/1995 | Smith ............................. 43/113 |
| 5,628,142 | A * | 5/1997 | Kitterman et al. .............. 43/114 |
| 5,634,293 | A | 6/1997 | Mike et al. |
| 6,044,584 | A | 4/2000 | Lynn |
| 6,067,746 | A | 5/2000 | Kistner et al. |
| 6,178,687 | B1 * | 1/2001 | Frisch ............................. 43/114 |
| 6,185,862 | B1 | 2/2001 | Nelson |
| 6,353,939 | B1 | 3/2002 | Arber |
| 6,651,379 | B1 | 11/2003 | Nelson |
| 6,842,934 | B1 | 1/2005 | McKay, Jr. et al. |
| 7,060,337 | B2 | 6/2006 | Williamson |
| 7,210,265 | B2 | 5/2007 | Jacobson |
| 2002/0076427 | A1 | 6/2002 | Hurwitz |
| 2002/0112395 | A1 | 8/2002 | Marsh |
| 2002/0124457 | A1 | 9/2002 | Cosenza |
| 2008/0028669 | A1 * | 2/2008 | Hurwitz ........................... 43/114 |
| 2010/0011655 | A1 * | 1/2010 | Frisch ............................. 43/114 |

OTHER PUBLICATIONS

Evercare Professional Lint Roller. This lint roller contains 60 adhesive sheets non-removably supported over a cylindrical body. The body is connected to an elongated handle. The base allows the sheets to spin around the base for lint removal. Each sheet is perforated for removal from the rest of the sheets and the base. The roller's dimensions are 4 inches wide and 29.5 feet long. The Scotch Mini Lint Roller was purchased in Jan. 2010.

Cantech Utility Grade Masking Tape. This utility grade masking tape is made with crepe paper and coated with a synthetic rubber adhesive. The tape is 4.5 millimeters thick. The tape comes in different widths including 12 millimeters, 18 millimeters, 24 millimeters, 36 millimeters, and 48 millimeters wide. The tape is 55 meters long. The tape is non-removably supported over a round body (3 web pages printed out from www.cttgroup.com/cantech on Dec. 9, 2009).

www.shop3m.com/70071423522.html (1 web page printed out from www.shop3m.com on Jan. 28, 2010).

* cited by examiner

DEVICE FOR THE REMOVAL OF ARACHNIDS, AND METHOD FOR REMOVAL OF SMALL ARACHNIDS AND INSECTS

CROSS REFERENCE TO RELATED APPLICATIONS

This application claims the benefit of U.S. provisional patent application No. 61/271,778 which was filed on Jul. 27, 2009. That application is entitled "Stick a Tick," and is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

Field of the Invention

Individuals who spend time outdoors, particularly in natural or rural areas, may be exposed to small arachnids. Such arachnids include ticks and chiggers. Ticks and chiggers are bloodsucking parasites that can find exposed skin and attach themselves to a human host. A tick will typically only drop off of a host after the tick has become fully engorged with blood. A chigger can actually burrow itself under the skin.

Tick and chigger bites can cause skin reactions, such as itching, rashes, and swelling. While most bites can be safely treated at home, those that cause allergic reactions may require prompt medical attention. In addition, scars may remain on the skin from uncontrolled scratching.

Ticks and chiggers can be found in many parts of the world. Many species of these arachnids are capable of transmitting diseases through bites or excrement. More than one disease may be transmitted by a single bite. Diseases that certain species of these small arachnids carry include, but are not limited to, Rocky Mountain spotted fever, relapsing fever, Lyme disease, tularemia, some forms of encephalitis, ehrlichiosis, babesiosis, and Texas cattle fever. Disease symptoms can be extremely subtle and some can remain dormant for years.

Small arachnids are difficult to detect. For example, ticks generally range in size from about 0.2 to 0.6 centimeters (about 0.08 to 0.24 inches) in length. Female ticks may be 1 centimeter (0.4 inches) or more in diameter when fully engorged with blood, but even these females will be difficult to see before the bite begins. It is common for a particular tick-and-host combination to harbor a specific disease organism, with an infestation being limited to a relatively small geographical area.

In order to prevent contact with or bites from small arachnids, individuals will sometimes use a spray repellant. However, spray repellants comprise chemicals such as DEET or permethrin. Such chemicals may carry a risk of an allergic reaction and should be used in moderation and with care in accordance with instructions. Moreover, when using the product, the hands, eyes and mouth of the user should be avoided, particularly with children.

Therefore, a need exists for a device that physically removes arachnids and small insects from the skin or clothing before attachment to skin without the need of a spray repellant. A need further exists for a method of mechanically removing small arachnids such as ticks and small insects such as fleas from skin or clothing, thereby reducing the chance of being bitten or infested.

SUMMARY OF THE INVENTION

A device for the removal of small arachnids and insects is first provided. The device is intended primarily for the removal of small arachnids from the skin and clothing of a human; however, the device may be equally effective for removing small arachnids and fleas from mammals having very short hair. In addition, the device may be used to remove arachnids from the upholstery of a car or furniture.

The device is described herein primarily in connection with the removal of arachnids. However, the device is equally effective for the removal of small insects such as fleas and so-called fire ants. Fleas and ants are insects, not arachnids. However, fleas can also be blood-sucking parasites that transmit diseases. Fire ants, of course, are known across Texas and much of the South for their painful stings.

In one embodiment, the device first includes a body. The body has a first end and a second end. The device also includes an elongated stem, also having a first end and a second end. The first end of the stem is projected from the second end of the body. The second end of the stem comprises a retaining member such as a collet ring, or other member having retaining tabs.

The device also comprises a tubular tape cartridge. The tape cartridge has a central supporting base member that is received on and rotates around the elongated stem. The tape cartridge also has a tape roll comprising a series of tape sections separated by perforations. In one aspect, each tape section has a width that is at least the circumference of the supporting base member. The tape roll defines an elongated substrate wound over the supporting base member, with the tape roll having a substantially non-sticking surface on an inner side, and an adhesive surface on an opposing outer side.

The tape cartridge itself has a length that is less than a length of the elongated stem. In this way the tape cartridge may be removably received over the collet ring and retained along the elongated stem.

The device may also include a cap. The cap removably covers the stem and tape cartridge. In one aspect, the cap of the device is threadedly connected to the body.

In one aspect, the body of the device defines a tubular member having a bore therein. The bore is dimensioned to receive a tape section after the tape section has been used and torn from the tape roll. The device then further comprises a butt that is removably received on the first end of the body to seal the bore. The bore may receive the used tape section for temporary storage.

The present inventions also include a method for removing small bugs. The method may be used for the removal of small arachnids from the skin and clothing of a human. In addition, the method may be used for removing ticks, chiggers and fleas from mammals having very short hair before the arachnids attach themselves to the skin of the mammal. In addition, the method may be used for removing small arachnids and small insects from the upholstery of a vehicle or furniture.

In one embodiment, the method first includes providing an arachnid removal device. The arachnid removal device is in accordance with the device described above, in any of its various embodiments.

The method also includes removing the cap while holding the body. Removing the cap preferably defines unscrewing the cap from the body. Removal of the cap exposes the tape roll for use. The method then includes rolling the tape roll across the surface in order to capture arachnids and insects. The surface may be, for example, the clothing or skin of a human.

The method also includes pulling a leading edge of the tape roll, and then tearing off at least one section of the tape roll along a perforation. This leaves a new, clean section of the tape roll exposed.

In one aspect, the body defines an elongated tubular member having a bore therein. The device further comprises a butt that is removably received on the first end of the body to seal the bore. The method may then further comprise removing the butt from the body, inserting the at least one tape section torn from the tape roll into the bore of the body, and replacing the butt to seal the bore of the body.

BRIEF DESCRIPTION OF THE DRAWINGS

So that the manner in which the present invention can be better understood, certain illustrations and flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

A device for the removal of small arachnids and insects is disclosed herein. The device is intended primarily for the removal of small arachnids from the skin and clothing of humans. However, the device may be equally effective for removing arachnids from mammals having very short hair. In addition, the device may be used to remove arachnids and insects from the upholstery of a car or an item of furniture.

The device is primarily described herein in connection with the removal of arachnids. However, the device is equally effective for the removal of small insects such as fleas and so-called fire ants. Fleas and ants are insects, not arachnids.

Figure 1:
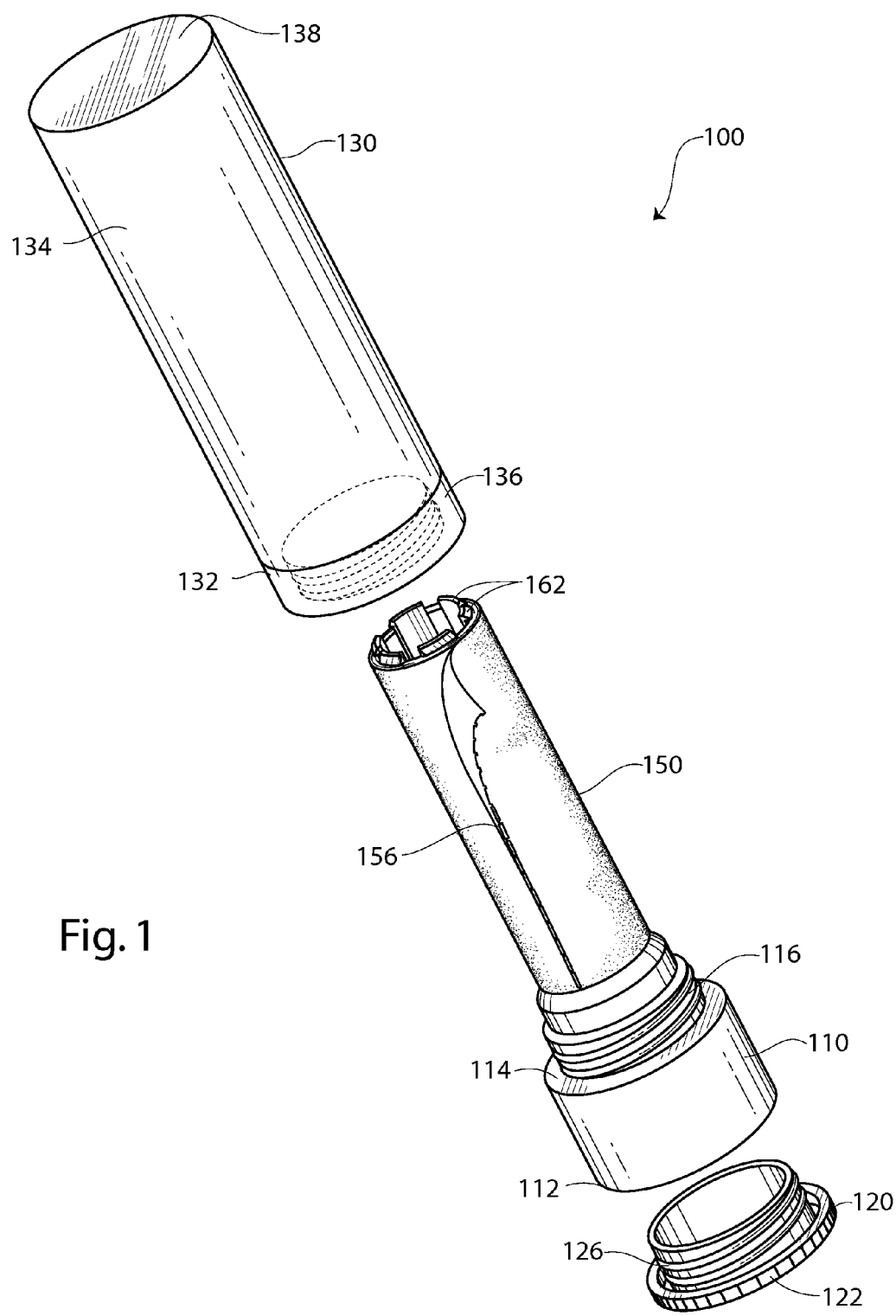
FIG. 1 is a perspective view of a device for removing small arachnids and insects from a surface, in one embodiment. Here, a cap, body and butt are exploded apart for ease of reference.
Figure 2:
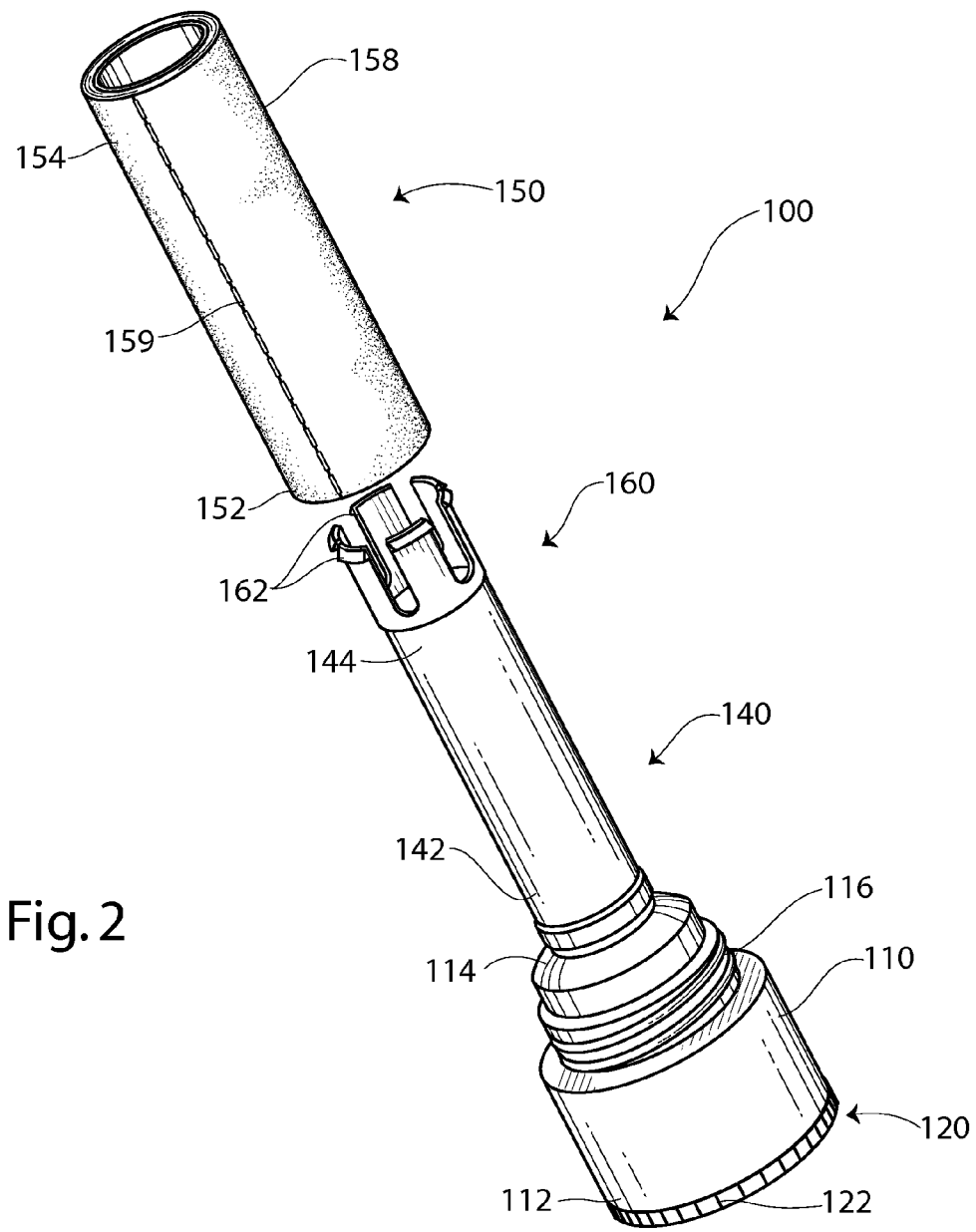
FIG. 2 is another perspective view of the device of FIG. 1 for removing small arachnids and insects from a surface. Here, a tubular tape cartridge and stem are exploded apart for ease of reference.
Figure 3:
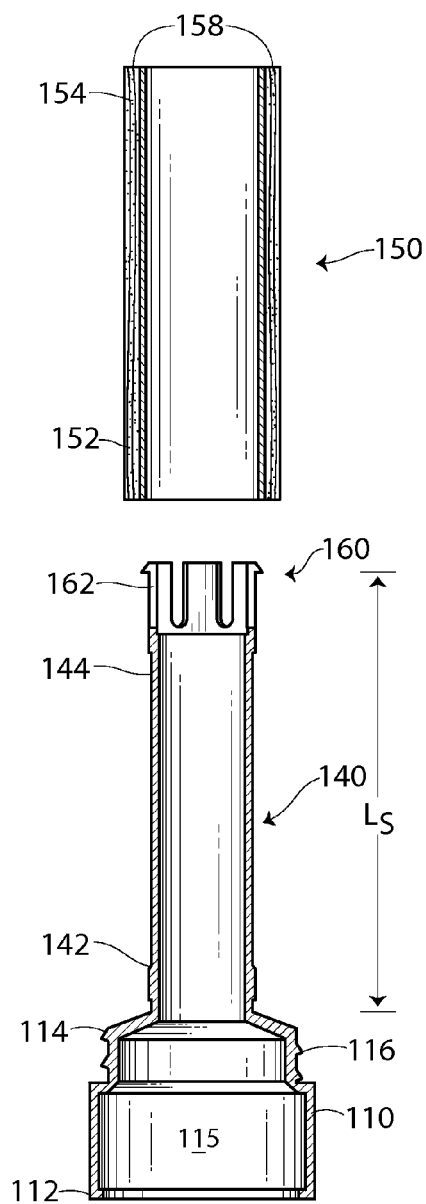
FIG. 3 is a cross-sectional view of certain parts of the device for removing small arachnids and insects from a surface, of FIG. 1. Specifically, a body, elongated stem and tubular tape cartridge are seen in cross-section, with the tubular tape cartridge being exploded away from the elongated stem for ease of reference.

The removal device is described herein with reference to FIGS. 1 through 3, together. These figures present features of a device 100 for the removal of small arachnids insects, in one embodiment.

First, FIG. 1 is a perspective view of the device 100 for removing arachnids and insects from a surface, in one embodiment. In FIG. 1, certain parts of the device 100 are exploded apart for ease of reference.

FIG. 2 presents another perspective view of the device 100 for removing arachnids and insects from a surface. Once again, certain parts of the device 100 are exploded apart for ease of reference.

FIG. 3 is a cross-sectional view of certain parts of the device 100 for removing arachnids and insects from a surface. Again, certain parts of the device 100 are exploded apart for ease of reference.

Referring to the drawings together, the device 100 first includes a body 110. The body 110 preferably defines a short tubular member having a circular profile. The body 110 has a first end 112 and a second end 114.

The device 100 also includes an elongated stem 140. The stem 140 also has a first end 142 and a second end 144. The first end 142 of the stem 140 is connected and preferably integral to the second end 144 of the body 110. The stem 140 also defines a tubular body.

The second end 144 of the stem 140 comprises a retaining member. In the illustrative arrangement of FIGS. 1 through 3, the retaining member is a collet ring 160 comprising a set of collet fingers 162. However, other removably securable arrangements may be provided, such as another device having retaining tabs.

The device 100 also comprises a tubular tape cartridge 150. The tape cartridge 150 has a first end 152 and a second end 154. The tape cartridge 150 comprises an inner supporting base member 155 that generally extends from the first end 152 to the second end 154. The supporting base member 155 is preferably fabricated from a stiffened cellulosic member such as cardboard. The base member 155 is dimensioned and configured to be received on and to freely rotate around the elongated stem 140.

The tape cartridge 150 also has a tape roll 158. The tape roll 158 has a leading edge 156 that may be pulled in order to unwind the tape roll 158 from the base member 155. The tape roll 158 defines an elongated substrate wound over the supporting base member 155. The tape roll 158 has a substantially non-sticking surface on an inner side, and an adhesive surface on an opposing outer side.

The tape cartridge 150 may be an elongated roll of masking tape. A source of such tape is Cantech Industries, Inc. of Johnson City, Tenn. Such tape may comprise a crepe paper substrate coated on one side with synthetic or thermoplastic rubber adhesive. Such tape may have a thickness of, for example, 4.5 mm to 5.5 mm and may be temperature resistant up to 55° C. (130° F.).

Figure 4:
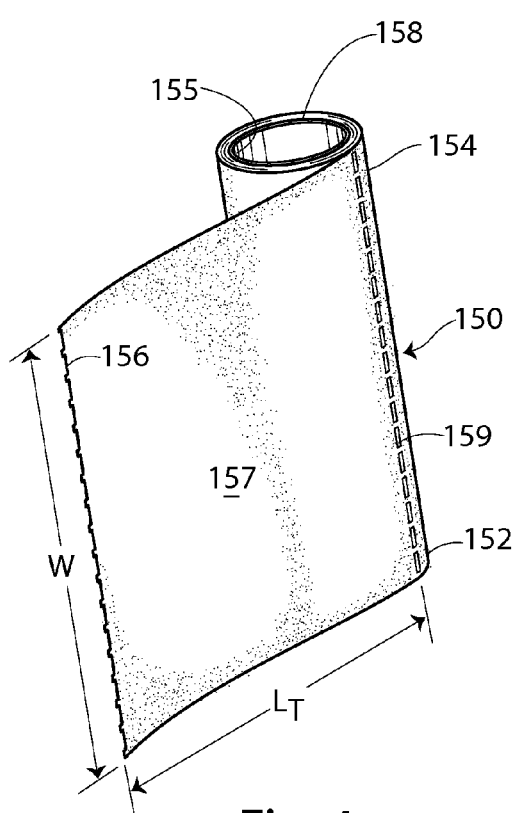
FIG. 4 is a perspective view of a tubular tape cartridge of the arachnid removal device of the present invention, in one embodiment. The tape roll is being partially unwound.

FIG. 4 provides a perspective view of the tubular tape cartridge 150. For illustrative purposes, the tape roll 158 is partially unwound from the base member 155. The tape roll 158 comprises a series of tape sections 157 wound around the supporting base member 155. The tape sections 157 are separated by perforations 159. In one aspect, each tape section 157 has a length "$L_T$" that is at least the circumference of the supporting base member 155.

The tape cartridge 150 preferably has a width "W" that is less than a length "$L_S$" of the elongated stem 140. In this way, the tape cartridge 150 may be removably received over the collet ring 160 at the second end 154 of the stem 150. The collet ring 160 retains the tape cartridge 150 along the elongated stem 140 until the tape cartridge 150 is pulled with force, thereby compressing the retaining fingers 162.

The device 100 also includes a cap 130. The cap 130 removably covers the stem 140 and tape cartridge 150. In one aspect, the cap 130 of the device 100 is threadedly connected to the body 110 at threads 116. In FIG. 1, the cap 130 is exploded away from the body 110. It can be seen that the cap 130 has a first end 132 and a second end 134. The cap 130 has threads (seen in phantom at 136) at the first end 132. The threads 136 interface with threads 116 of the body 110. The cap 110 also has an enclosure 138 at the second end 134 to protect the tape roll 158.

In one aspect, the body 110 of the device 100 defines an elongated tubular member having a bore 115 therein. The bore 115 is seen in the cross-sectional view of FIG. 3. In addition, the body 100, the elongated stem 140, and the tubular tape cartridge 150 are seen in cross-section. The tubular tape cartridge 150 is shown exploded away from the elongated stem 140 for ease of reference.

The bore 115 is dimensioned to receive a tape section 157 after the tape section 157 has been used and torn from the tape roll 158. The bore 115 is then sealed by use of a butt 120. The butt 115 is removably received on the first end 112 of the body 110 to seal the bore 115.

The butt 120 preferably includes serrations 122 around an outer edge. The serrations 122 assist the user in removing the butt 120 from the first end 142 of the body 110. Preferably, the butt 120 also includes threads 126 that engage with threads (not seen) within the body 110 in order to provide a means for removably connecting the butt 120 to the body 110.

In operation, a user may remove the cap 130 from the body 110 of the device 100. Holding the body 110, the user then rolls the tubular tape cartridge 150 over the clothing or skin of a human. This causes the tape cartridge to rotate about the elongated stem 140. The device 100 targets small arachnids and insects by rolling over the "bugs'" backs, sticking the "bugs" to the adhesive on the tape sections 157. The adhesive on the outer surface of the tape sections 157 will remove crawling ticks and other "bugs" on a person's clothing or skin and reduce the risk of disease. In cases where there may be many ticks or insects on a person's legs and arms, the device 100 allows the critters to be removed efficiently without the use of repellants.

The device 100 may be used by persons who work or recreate outdoors in wooded or grassy areas where small arachnids or insects live. Such persons include hunters, naturists, landscapers, military personnel, campers, gardeners, hikers, farmers, land surveyors, mail carriers, utility linemen, and the like. Any outdoorsman that wants to spend more time in nature and limit the risk of being bitten or infested by ticks, chiggers, ants or fleas will find the device 100 beneficial.

Figure 5:
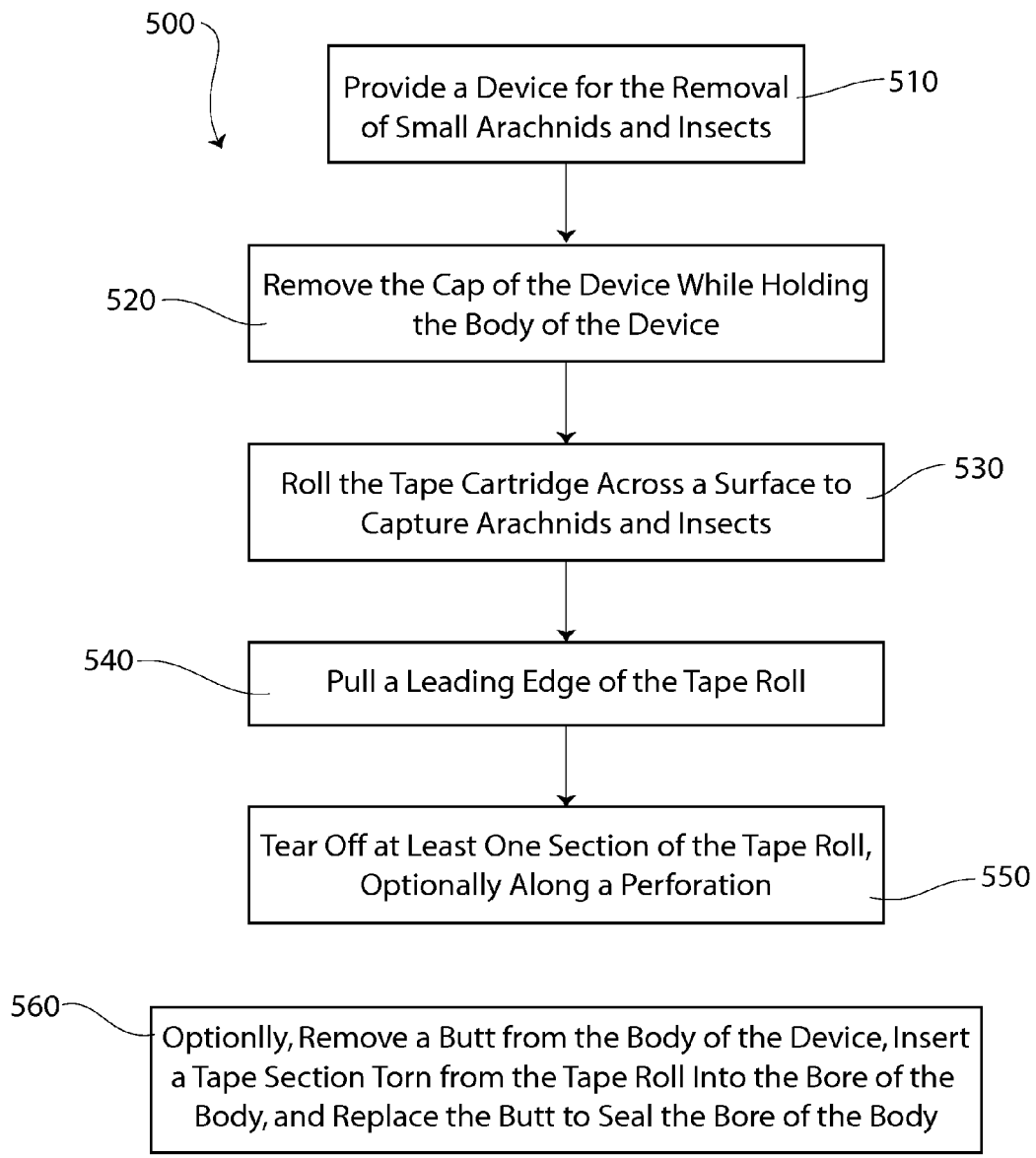
FIG. 5 is a flow chart showing steps for a method of removing small arachnids from a surface, in one embodiment.

The present inventions also include a method for removing arachnids and insects. FIG. 5 is a flow chart showing steps for a method 500 of removing small arachnids and insects from a surface, in one embodiment. The method 500 may be used for the removal of arachnids and insects from the skin and clothing of a human. In addition, the method may be used for removing ticks, chiggers and fleas from mammals having very short hair before the arachnids attach themselves to the skin of the mammal. In addition, the method may be used for removing arachnids and small insects such as fleas from the upholstery of a vehicle or furniture.

In one embodiment, the method 500 first includes providing a device for the removal of small arachnids and insects. This is shown at Box 510. The device is in accordance with the device 100 described above, in any of its various embodiments.

The method 500 also includes removing the cap while holding the body. This is seen at Box 520. Removing the cap preferably defines unscrewing the cap from the body. Removal of the cap exposes the tape roll of the tubular tape cartridge for use.

The method 500 further then includes rolling the tape cartridge across the surface in order to capture arachnids and small insects. This step is provided at Box 530. The surface may be, for example, the clothing or skin of a human.

The method 500 also includes pulling a leading edge of the tape roll. This is seen at Box 540. From there, the method 500 includes tearing off at least one section of the tape roll. This is provided at Box 550. Preferably, a perforation is provided between tape sections to assist the tearing step. For purposes of this disclosure, tearing may also include cutting. In any instance, removal of the used tape section or sections leaves a new, clean section of the tape roll exposed.

In one aspect, the body of the device for removing arachnids and insects defines a tubular member having a bore therein. The device further comprises a butt that is removably received on a first end of the body to seal the bore. The method 500 may then further comprise removing the butt from the body, inserting the at least one tape section torn from the tape roll into the bore of the body, and replacing the butt to seal the bore of the body.

In another aspect, the method 500 includes removing the supporting base member of the tubular tape cartridge and any remaining tape sections from the elongated stem. This means that the tape cartridge is pulled over the retaining tabs at the second end of the stem. Preferably, the retaining tabs are elastically compressible. The method 500 then includes installing a new tubular tape cartridge over the collet ring (or other tabs) and onto the stem. In this way, a fresh tape roll is available to a user. All of this is provided at Box 560.

As can be seen, a device is offered herein that provides a self-contained sticky tape roller system for the removal of arachnids such as ticks and chiggers before they can bite and/or embed themselves in a person's skin. The sticky tape roller system includes a sectioned, adhesive substrate wound on a tube that, when rolled across the clothing or skin, causes ticks and other small arachnids or insects to stick to the tape for easy removal. Once a tape section is used, the tape section may be torn at a perforated edge. Then the tape section may be discarded or temporarily stored in a bore of the device. The device will then be ready to use again.

The device is easy to carry in or on a backpack or carrying case. The device can also be carried on a belt in most cell phone clip holders. It may also be easily stored in a tackle box or working kit for easy use when needed. In addition, the adhesive material may be impregnated with a pesticide.

We claim:

1. A method for removing arachnids and insects from a surface, the method comprising:
    providing a device for removing small arachnids and insects, the device comprising:
        a body having a first end and a second end and serving as a handle, the handle defining a bore therein;
        an elongated stem also having a first end and a second end, the first end of the stem being connected to and extending from the handle, and the second end of the stem comprising a retractable retaining member;
        a tubular tape cartridge, the tape cartridge having:
            a supporting base member that is received on and freely rotates around the elongated stem,
            a tape roll wound around the supporting base member comprising a series of tape sections separated by perforations, each tape section having an adhesive outer surface, and
            the tape cartridge having a width that is less than a length of the elongated stem so that the tape cartridge may be removably received over the retaining member and retained along the elongated stem; and a cap dimensioned to cover the stem and the tape cartridge; and a butt that is removably received on the first end of the body to seal the bore;

removing the cap;

while holding the handle, rolling the tape roll across the surface in order to adhesively capture arachnids, insects, or both, thereby removing arachnids, insects, or both from the surface;

pulling a leading edge of the tape roll;

tearing off at least one section of the tape roll along perforations;

removing the butt from the body;

inserting the at least one tape section torn from the tape roll into the bore of the body, and replacing the butt to seal the bore of the body.

2. The method of claim 1, wherein the surface is (i) the skin or clothing of a human, (ii) the upholstery of a car seat or furniture, or (iii) the skin of an animal having short hair.

3. The method of claim 1, wherein removing the cap comprises unscrewing the cap from the body.

4. The method of claim 1, wherein:

the supporting base member of the tape roll is fabricated from a stiffened cellulosic material;

the tape roll comprises a substantially non-sticking surface on an inner side; and a length of each tape section is at least the circumference of the supporting base member.

5. The method of claim 1, wherein the body, the elongated stem, and the cap are fabricated from a plastic material.

6. The method of 1, further comprising:

removing the supporting base member and any remaining tape sections over the retaining member and from the elongated stem; and installing a new tubular tape cartridge over the retaining member and onto the stem.

7. The method of claim 6, wherein the retaining member is a collet ring.

* * * * *